(12) United States Patent
Viswambharan et al.

(10) Patent No.: US 8,306,391 B2
(45) Date of Patent: Nov. 6, 2012

(54) METHOD FOR RESUMING CONTENT REPRODUCTION ACROSS DEVICES

(75) Inventors: Manoj Viswambharan, Morganville, NJ (US); Louis Robert Litwin, Edison, NJ (US)

(73) Assignee: Thomson Licensing, Boulogne Billancourt (FR)

( * ) Notice: Subject to any disclaimer, the term of this patent is extended or adjusted under 35 U.S.C. 154(b) by 798 days.

(21) Appl. No.: 12/226,284

(22) PCT Filed: May 8, 2006

(86) PCT No.: PCT/US2006/017695
§ 371 (c)(1),
(2), (4) Date: Oct. 14, 2008

(87) PCT Pub. No.: WO2007/130052
PCT Pub. Date: Nov. 15, 2007

(65) Prior Publication Data
US 2009/0274453 A1 Nov. 5, 2009

(51) Int. Cl.
*H04N 9/80* (2006.01)
*H04N 5/76* (2006.01)
*H04N 5/445* (2011.01)
*H04N 5/765* (2006.01)
*H04N 5/775* (2006.01)
*H04N 5/783* (2006.01)
*H04N 5/917* (2006.01)
*H04N 5/937* (2006.01)
*H04N 7/16* (2011.01)
*H04N 7/173* (2011.01)
*G06F 15/16* (2006.01)
*G06F 17/00* (2006.01)

(52) U.S. Cl. ........ 386/241; 386/200; 386/201; 386/230; 386/231; 386/235; 386/240; 386/249; 386/297; 386/328; 386/343; 386/349; 348/563; 348/564; 709/219; 709/246; 715/234; 725/87; 725/88; 725/100; 725/109; 725/110; 725/112; 725/114; 725/115; 725/131; 725/135; 725/138; 725/139

(58) Field of Classification Search .................. 386/241, 386/201, 230, 231, 235, 240, 249, 328, 343, 386/349, E5.001, E5.013, 200, 297, E5.002; 348/563, 564, E5.006, E5.103, E5.105, E7.061, 348/E7.07, E7.071; 375/E7.021, E7.024, 375/E7.025; 709/219, 246; 715/234; 725/87, 725/88, 100, 109, 110, 112, 114, 115, 131, 725/135, 138, 139
See application file for complete search history.

(56) References Cited

U.S. PATENT DOCUMENTS
5,999,694 A 12/1999 Yasuda et al.
(Continued)

FOREIGN PATENT DOCUMENTS
CA 2301935 9/2000
(Continued)

OTHER PUBLICATIONS
Supplemental European Search Report dated Apr. 15, 2009.
(Continued)

*Primary Examiner* — Thai Tran
*Assistant Examiner* — Syed Hasan
(74) *Attorney, Agent, or Firm* — Robert D. Shedd; Joseph J. Opalach; Reitseng Lin

(57) ABSTRACT

A method for operating a data reproduction device enables users to resume reproduction of audio and/or video content across different devices of the same or different type. According to an exemplary embodiment, the method includes steps of receiving first index data from a different data reproduction device wherein the first index data indicates a first position in content in a first format and the content includes at least one of audio and video data, determining a second position in the content in a second format using the first index data, and enabling reproduction of the content in the second format beginning from the second position.

24 Claims, 4 Drawing Sheets

U.S. PATENT DOCUMENTS

| | | | |
|---|---|---|---|
| 6,016,166 | A | 1/2000 | Huang et al. |
| 6,574,172 | B2 | 6/2003 | Hamada et al. |
| 7,302,697 | B1 * | 11/2007 | Wilson et al. ............... 725/110 |
| 7,536,079 | B2 * | 5/2009 | Barron ........................ 386/343 |
| 2002/0059621 | A1 * | 5/2002 | Thomas et al. ............... 725/87 |
| 2002/0099967 | A1 | 7/2002 | Kawaguchi |
| 2003/0028892 | A1 * | 2/2003 | Gewickey et al. ............ 725/110 |
| 2003/0068155 | A1 | 4/2003 | Vasilevsky et al. |
| 2004/0146274 | A1 | 7/2004 | Ishibashi |
| 2005/0097618 | A1 * | 5/2005 | Arling et al. ................ 725/114 |
| 2005/0166258 | A1 * | 7/2005 | Vasilevsky et al. ........... 725/138 |
| 2006/0015580 | A1 * | 1/2006 | Gabriel et al. ................ 709/219 |
| 2007/0189711 | A1 * | 8/2007 | Ash et al. ..................... 386/83 |
| 2007/0263982 | A1 | 11/2007 | Hasegawa |

FOREIGN PATENT DOCUMENTS

| | | |
|---|---|---|
| CN | 1538707 A2 | 10/2004 |
| CN | 1567754 | 1/2005 |
| EP | 0653884 | 5/1995 |
| EP | 1450369 | 8/2004 |
| EP | 1515341 | 3/2005 |
| EP | 1596594 | 11/2005 |
| JP | 9135421 | 5/1997 |
| JP | 200216655 | 1/2002 |
| JP | 2002-281447 | 9/2002 |
| JP | 2002281569 | 9/2002 |
| JP | 2002281569 A | 9/2002 |
| JP | 2002-330376 A | 11/2002 |
| JP | 2003-101921 | 4/2003 |
| JP | 2003-224822 A | 8/2003 |
| JP | 2005-142610 | 6/2005 |
| WO | WO9610889 | 4/1996 |
| WO | WO0210936 | 2/2002 |
| WO | WO03067594 | 8/2003 |
| WO | WO2004006574 | 1/2004 |
| WO | WO2005043901 | 5/2005 |

OTHER PUBLICATIONS

International Search Report, dated Jan. 31, 2007.

* cited by examiner

METHOD FOR RESUMING CONTENT REPRODUCTION ACROSS DEVICES

This application claims the benefit, under 35 U.S.C. §365 of International Application PCT/US2006/017695, filed 8 May 2006, which was published in accordance with PCT Article 21(2) on 15 Nov. 2007, in English.

BACKGROUND OF THE INVENTION

1. Field of the Invention

The present invention generally relates to devices capable of reproducing audio and/or video data, and more particularly, to a method for enabling users to resume reproduction of audio and/or video content across different such devices.

2. Background Information

Data reproduction devices such as televisions, personal video recorders (PVRs), digital versatile disc (DVD) players, compact disc (CD) players and other devices may allow users to control the reproduction of audio and/or video content (e.g., television shows, movies, songs, etc.). For example, such devices may allow users to interrupt, such as stop or pause, the reproduction of audio and/or video content, and then later resume the reproduction.

In some cases, it may be desirable for users to begin reproduction of audio and/or video content on one data reproduction device in one setting (e.g., living room, den, etc.), stop/pause the reproduction, and then resume the reproduction on a different data reproduction device of the same or different type in a different setting (e.g., bedroom, in a vehicle while traveling, etc.). In such cases, a problem may arise when users attempt to resume reproduction at the same place within the content they left off (i.e., where reproduction stopped). In particular, users may have to scan through the audio and/or video content to locate the particular place they left off. This can be unduly inconvenient and time consuming for users, particularly if the content is rather lengthy (e.g., 2 hour movie, etc.).

Accordingly, there is a need for a method for enabling users to resume reproduction of audio and/or video content across different such devices, even in cases where different data reproduction devices may access and/or store the audio and/or video content in different formats. The present invention addresses these and/or other issues.

SUMMARY OF THE INVENTION

In accordance with an aspect of the present invention, a data reproduction device is disclosed. According to an exemplary embodiment, the data reproduction device comprises an input operative to receive first index data from a second data reproduction device. The first index data indicates a first position in content in a first format and the content includes at least one of audio and video data. A processor is operative to determine a second position in the content in a second format using the first index data, and to enable reproduction of the content in the second format beginning from the second position, wherein the first position represents a position in which the second data reproduction device interrupted reproducing the content.

In accordance with another aspect of the present invention, a method for operating a first data reproduction device is disclosed. According to an exemplary embodiment, the method comprises steps of receiving first index data from a second data reproduction device wherein the first index data indicates a first position in content in a first format, the first position represents a position in which said second data reproduction device interrupted reproducing said content, and the content includes at least one of audio and video data, determining a second position in the content in a second format using the first index data, and enabling reproduction of the content in the second format beginning from the second position.

In accordance with another aspect of the present invention, another data reproduction device is disclosed. According to an exemplary embodiment, the data reproduction device comprises memory means for storing first index data indicating a first position in content in a first format wherein the first position represents a position in which the data reproduction device interrupts reproducing the content and the content includes at least one of audio and video data. Output means outputs the first index data to a second data reproduction device. The second data reproduction device determines a second position in the content in a second format using the first index data and enables reproduction of the content in the second format beginning from the second position.

In accordance with yet another aspect of the present invention, another data reproduction device is disclosed. According to an exemplary embodiment, the data reproduction device comprises memory means for storing first index data indicating a first position in content stored in a first format, the first position representing a position in which the first data reproduction device interrupts reproducing said content in the first format, the content including at least one of audio and video data. The first reproduction device includes a processor operative to determine a second position in the content stored in a second format using said first index data, wherein the processor enables reproduction of said content in said second format beginning from said second position.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DESCRIPTION OF THE PREFERRED EMBODIMENTS

Figure 1:
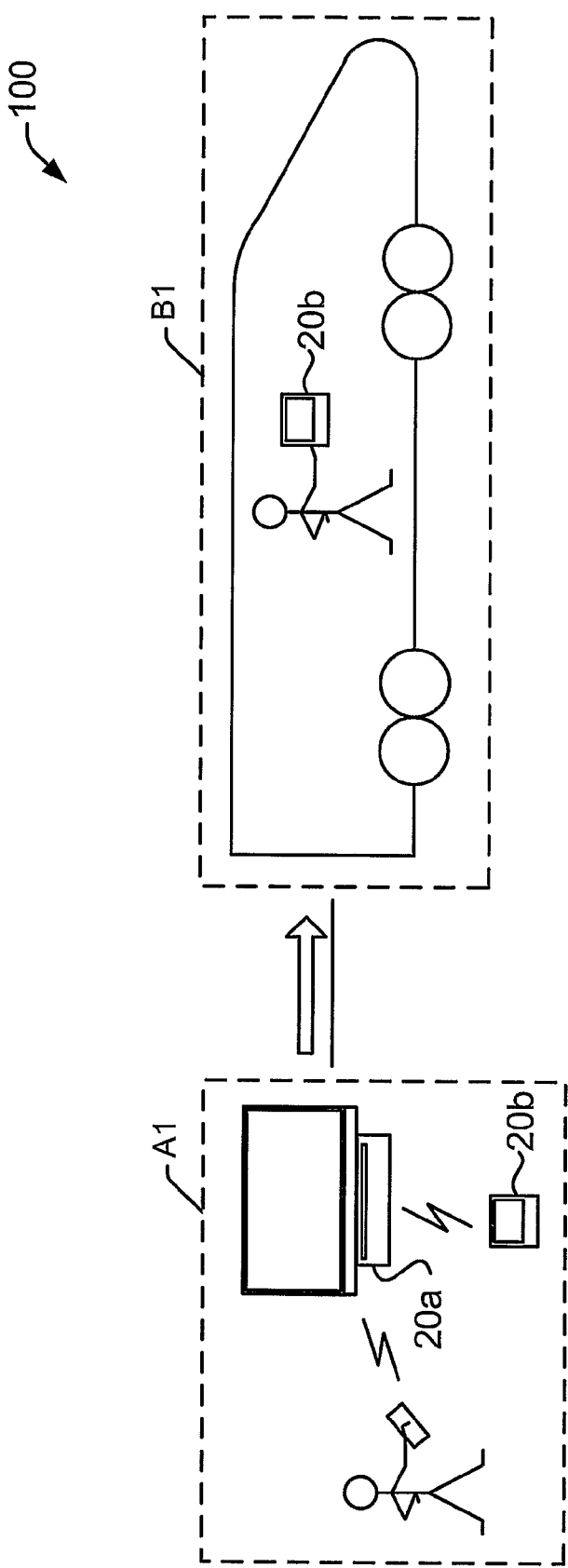
FIG. 1 is a diagram depicting a first exemplary scenario for implementing the present invention.

Referring now to the drawings, and more particularly to FIG. 1, a first exemplary scenario 100 for implementing the present invention is depicted. In particular, scenario 100 of FIG. 1 represents a fixed device to mobile device application of the present invention. In FIG. 1, a user begins reproducing audio and/or video content (e.g., television show, movie, song, etc.) in a first format via a first data reproduction device 20a in his/her home represented as setting A1. According to an exemplary embodiment, first data reproduction device 20a of FIG. 1 is embodied as a fixed device such as a combined television and PVR, but may be embodied as any type of data reproduction device. First data reproduction device 20a reproduces a given amount (e.g., half an hour, etc.) of the audio and/or video content in the first format in setting A1 until he/she has to leave and catch a train in another setting represented as setting B1 in FIG. 1. According to an exemplary embodiment, first data reproduction device 20a stops reproducing the audio and/or video content in the first format in setting A1 at a first position within the content.

In setting B1, the user may want to resume reproduction of the same audio and/or video content he/she was previously listening to and/or viewing in setting A1, but in a second format on a second data reproduction device 20b. According to an exemplary embodiment, second data reproduction device 20b of FIG. 1 is embodied as a mobile device such as a portable DVD player, but may be embodied as any type of data reproduction device. To facilitate reproduction of the audio and/or video content in the second format on second data reproduction device 20b in setting B1, index data indicating the first position where first data reproduction device 20a stopped reproducing the audio and/or video content in setting A1 is used. In order to be used in different formats, the index data should represent the time interval in reproducing the content from the beginning to the first position. According to an exemplary embodiment, second data reproduction device 20b receives the index data from first data reproduction device 20a and/or another device and uses the index data to determine a second position in the audio and/or video content in the second format. Second data reproduction device 20b then begins reproduction of the audio and/or video content in the second format from the second position. Further exemplary details regarding the operation of first and second data reproduction devices 20a and 20b in settings A1 and B1 will be provided later herein.

Figure 2:
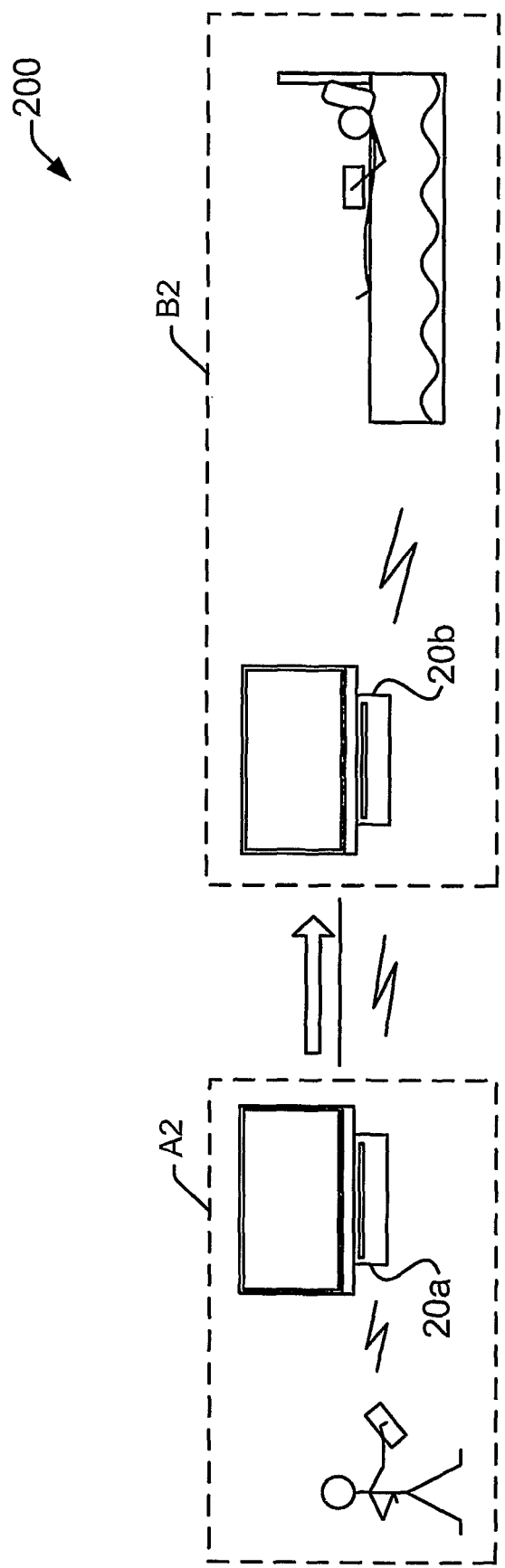
FIG. 2 is a diagram depicting a second exemplary scenario for implementing the present invention.

Referring to FIG. 2, a second exemplary scenario 200 for implementing the present invention is depicted. In particular, scenario 200 of FIG. 2 represents a fixed device to fixed device application of the present invention. In FIG. 2, a user begins reproducing audio and/or video content (e.g., television show, movie, song, etc.) in a first format via first data reproduction device 20a in one room of his/her home (e.g., living room, etc.) represented as setting A2. According to an exemplary embodiment, first data reproduction device 20a of FIG. 2 is embodied as a fixed device such as a combined television and PVR, but may be embodied as any type of data reproduction device. First data reproduction device 20a reproduces a given amount (e.g., half an hour, etc.) of the audio and/or video content in the first format in setting A2 until the user decides to move to another setting such as his/her bedroom represented as setting B2 in FIG. 2. According to an exemplary embodiment, first data reproduction device 20a stops reproducing the audio and/or video content in the first format in setting A2 at a first position within the content.

In setting B2, the user may want to resume reproduction of the same audio and/or video content he/she was previously listening to and/or viewing in setting A2, but in a second format on a second data reproduction device 20b. According to an exemplary embodiment, second data reproduction device 20b of FIG. 2 is embodied as a fixed device such as a combined television and PVR, but may be embodied as any type of data reproduction device. To facilitate reproduction of the audio and/or video content in the second format on second data reproduction device 20b in setting B2, index data indicating the first position where first data reproduction device 20a stopped reproducing the audio and/or video content in setting A2 is used. According to an exemplary embodiment, second data reproduction device 20b receives the index data from first data reproduction device 20a and/or another device and uses the index data to determine a second position in the audio and/or video content in the second format. Second data reproduction device 20b then begins reproduction of the audio and/or video content in the second format from the second position. Further exemplary details regarding the operation of first and second data reproduction devices 20a and 20b in settings A2 and B2 will be provided later herein. The present invention may also apply to scenarios other than those expressly described herein.

Figure 3:
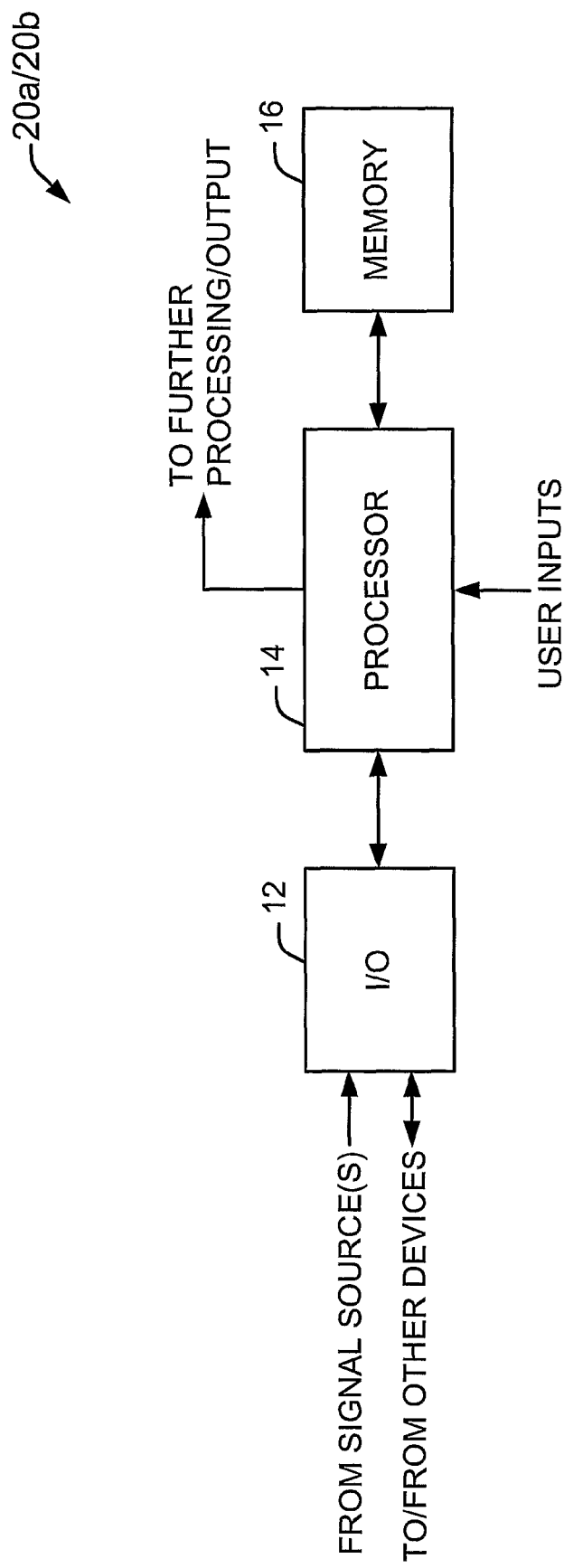
FIG. 3 is a block diagram of a data reproduction device according to an exemplary embodiment of the present invention.

Referring to FIG. 3, a block diagram of data reproduction device 20a/20b according to an exemplary embodiment of the present invention is shown. That is, first and second data reproduction devices 20a and 20b of FIGS. 1 and 2 each include the elements shown in FIG. 3. As indicated in FIG. 3, each data reproduction device 20a/20b comprises input/output (I/O) means such as I/O block 12, processing means such as processor 14, and memory means such as memory 16. For clarity of description, certain conventional elements associated with data reproduction device 20a/20b such as certain control signals/inputs, power signals/inputs and/or other elements may not be shown in FIG. 3.

I/O block 12 is operative to perform I/O functions of data reproduction device 20a/20b. According to an exemplary embodiment, I/O block 12 is operative to receive and output signals such as audio, video and/or data signals in analog and/or digital formats and in a wired and/or wireless manner. I/O block 12 may receive and output such signals for example from and to one or more other devices on a wired and/or wireless network. As indicated in FIG. 3, I/O block 12 may also be operative to receive signals from one or more signal sources such as terrestrial, cable, satellite, internet and/or other signal sources.

Processor 14 is operative to perform various signal processing and control functions of data reproduction device 20a/20b. According to an exemplary embodiment, processor 14 processes the audio, video and/or data signals provided from I/O block 12 by performing functions including tuning, demodulation, forward error correction, and transport processing functions to thereby generate digital data representing audio, video and/or data content. The digital data produced from such processing functions may be provided for further processing and/or output. Processor 14 is also operative to perform and/or enable other functions of data reproduction device 20a/20b including processing user inputs from input elements such as an integrated keypad, remote control device and/or other input element (not shown in FIG. 3), reading and/or writing data from and/or to memory 16, and/or other operations.

Processor 14 is also operative to execute software code that enables users to resume reproduction of audio and/or video content across different data reproduction devices 20a/20b. It should be noted that the data reproduction devices 20a/20b can be of the same or different type. According to an exemplary embodiment, processor 14 receives index data from I/O block 12 that indicates a first position in audio and/or video content in a first format. The first position represents a position in which a different data reproduction device 20a or 20b stopped reproducing the audio and/or video content. Processor 14 is operative to determine a second position in the audio and/or video content in a second format using the received index data, and to enable reproduction of the audio and/or video content in the second format beginning from the second position. Further exemplary details regarding processor 14 will be provided later herein.

Memory 16 is operative to perform data storage functions of data reproduction device 20a/20b. According to an exemplary embodiment, memory 16 may include mobile data storage media (e.g., DVD, CD, flash memory, etc.) and/or fixed data storage media (e.g., RAM, ROM, etc.) and is operative to store data such as software code, audio and/or video content, index data, user setup data, and/or other data. Data stored in memory 16 may for example be provided to data reproduction device 20a/20b from other devices via a network.

Figure 4:
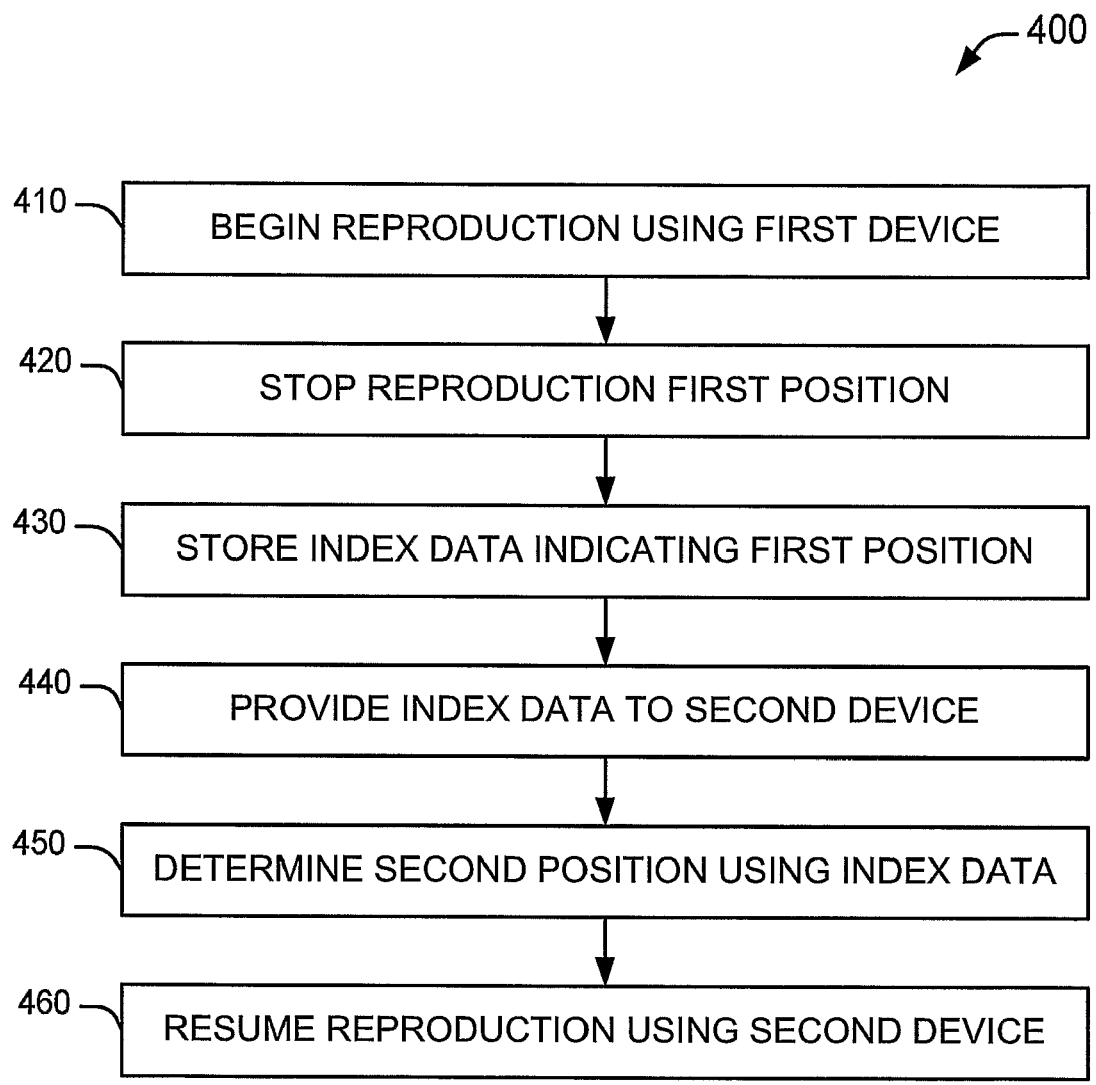
FIG. 4 is a flowchart illustrating steps according to an exemplary embodiment of the present invention.

Referring to FIG. 4, a flowchart 400 illustrating steps according to an exemplary embodiment of the present invention is shown. For purposes of example and explanation, the steps of FIG. 4 will be described with reference to the elements described above in FIGS. 1 to 3. The steps of FIG. 4 are exemplary only, and are not intended to limit the present invention in any manner.

At step 410, first data reproduction device 20a begins to reproduce audio and/or video content (e.g., television show, movie, song, etc.) in a first format. First data reproduction device 20a may have received the audio and/or video content in the first format from another device, and/or may have it stored in its memory 16. According to an exemplary embodiment, first data reproduction device 20a begins reproducing the audio and/or video content at step 410 responsive to a user input thereto (e.g., PLAY command, etc.). First data reproduction device 20a may for example be situated in setting A1 of FIG. 1 or setting A2 of FIG. 2 when reproduction begins at step 410. Also according to an exemplary embodiment, the first format of the audio and/or video content may for example correspond to a format such as composite, component, H.264, VC-1, MPEG-1, MPEG-2, MPEG-3, MPEG-4, DIVX, or other format.

At step 420, first reproduction device 20a stops reproducing the audio and/or video content in the first format at a first position. According to an exemplary embodiment, processor 14 of first data reproduction device 20a causes the reproduction of the audio and/or video content to stop at step 420 responsive to a user input thereto (e.g., STOP command, PAUSE command, etc.). The user may for example stop the reproduction at step 420 because he/she is leaving to another setting, such as to catch a train in setting B1 as indicated in FIG. 1, or to lie down in his/her bedroom in setting B2 as indicated in FIG. 2.

At step 430, index data indicating the first position where reproduction stopped on first data reproduction device 20a at step 420 is stored. According to an exemplary embodiment, the index data is stored in memory 16 of first data reproduction device 20a under the control of processor 14 and/or in memory of one or more other devices which are on a network connected to first data reproduction device 20a, second data reproduction device 20b, and/or one or more other devices (not shown in FIGS.). In addition to indicating the first position where reproduction stopped on first data reproduction device 20a at step 420, the index data stored at step 430 may include various other types of information. According to an exemplary embodiment, the stored index data may include the following fields: a content title field, a format field, a time field, a track number field, and a device identification field.

The foregoing fields are defined as follows. The content title field indicates the title of the content file that was being reproduced, including for example the particular DVD, volume, etc. The format field indicates the data format of the content such as composite, component, H.264, VC-1, MPEG-1, MPEG-2, MPEG-3, MPEG-4, DIVX, or other format. The time field indicates the time interval from the beginning of the content file to the point at which reproduction stopped (e.g., in HH:MM:SS format). Accordingly, the time field indicates the first position where reproduction stopped on first data reproduction device 20a at step 420. The track number field may be used to indicate the track in which reproduction stopped at step 420 for any content that uses track information. The device identification field is a unique manufacturer's identification for first data reproduction device 20a, which may for example be taken from a Universal Plug and Play device identification field.

At step 440, the index data stored at step 430 is provided to second data reproduction device 20b via I/O block 12 where it is stored in memory 16. The index data may be provided to second data reproduction device 20b at step 440 in various different ways. According to one exemplary embodiment, first data reproduction device 20a may provide the index data to second data reproduction device 20b at step 440 via any suitable wired and/or wireless link in response to the user input (e.g., STOP command, PAUSE command, etc.) that stopped reproduction of the audio and/or video content on first data reproduction device 20a at step 420. Also, if first data reproduction device 20a and second data reproduction device 20b are connected to other devices via a network, first data reproduction device 20a may also provide the index data to such other devices in a similar manner in response to the user input (e.g., STOP command, PAUSE command, etc.) that stopped reproduction of the audio and/or video content on first data reproduction device 20a at step 420.

According to another exemplary embodiment, second data reproduction device 20b may request the stored index data from first data reproduction device 20a and/or one or more other devices (not shown in FIGS.) on a network under the control of processor 14 at step 440 in response to a command to begin reproduction of the audio and/or video content on second data reproduction device 20b. According to this exemplary embodiment, processor 14 of second data reproduction device 20b may cause a signal requesting all index data applicable to the audio and/or video content to be transmitted over the network. In this manner, second data reproduction device 20b may receive different index data for the audio and/or video content from different devices responsive to the request. This situation may arise, for example, if multiple network users have previously listened to and/or watched the same audio and/or video content.

At step 450, second data reproduction device 20b determines a second position in the audio and/or video content in a second format using the index data provided at step 440. Second data reproduction device 20b may have received the audio and/or video content in the second format from another device, and/or may have it stored in its memory 16. According to an exemplary embodiment, the second format of the audio and/or video content may for example correspond to a format such as composite, component, H.264, VC-1, MPEG-1, MPEG-2, MPEG-3, MPEG-4, DIVX, or other format, but is different than the first format. Also according to an exemplary embodiment, processor 14 of second data reproduction device 20b determines the second position to correspond to the position of an intra-coded frame (a.k.a., I-frame) within the audio and/or video content in the second format that is closest to the first position, or that is closest to the first position by a user programmable amount (e.g., 3 seconds before first position, 30 seconds before first position, etc.). In particular, processor 14 may use data in the time field of the index data to determine the second location at step 450.

In the event that second data reproduction device 20b received different index data for the audio and/or video content from different devices at step 440, a user input may be provided to select which index data second data reproduction device 20b should use for purposes of resuming reproduction of the audio and/or video content. In the case of video content, a user may for example be provided multiple screen shots that each correspond to different index data. The user may then select one of the screen shots via user input to indicate which index data second data reproduction device 20*b* should use for purposes of resuming reproduction of the video content.

At step 460, second data reproduction device 20*b* begins to reproduce the audio and/or video content in the second format beginning from the second position identified at step 450, and taking any user selection inputs into account.

In yet another embodiment, each of the first and second reproduction devices 20*a* and 20*b* may store content in two different formats, for example, one in analog composite format and the other in MPEG-2 format. In such an embodiment, a reproduction device stores index data in a memory, indicating the first position where the reproduction in one format by the reproduction device is interrupted, provides index data to another reproduction device, receives index data from another reproduction device, and determines a second position in the content in the other format similar to those described above in other embodiments. However, when the reproduction device resumes reproduction of the content in the other format, the reproduction device may use the index data in the memory to determine the second position without requesting index data from other data reproduction devices in the network.

As described herein, the present invention provides a method for enabling users to resume reproduction of audio and/or video content across different devices. While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A first data reproduction device, comprising:
   an input operative to receive first index data from a second data reproduction device, said first index data indicating a first position in content in a first encoding format, said content including at least one of audio and video data;
   a processor operative to determine a second position in said content in a second encoding format using said first index data; and
   wherein said first position represents a position in which said second data reproduction device interrupted reproducing said content, and said processor enables reproduction of said content in said second encoding format beginning from said second position, wherein said first index data indicates a first time interval from a beginning of said content to said first position and a second time interval from the beginning of said content to said second position is equal to the first time interval minus a predefined amount.

2. The first data reproduction device of claim 1, wherein said first and second data reproduction devices are coupled through a communication link and said second data reproduction device sends said first index data to said first data reproduction device through said communication link.

3. The first data reproduction device of claim 1, wherein said predefined amount is user programmable.

4. The first data reproduction device of claim 1, wherein said second position represents a position of an intra-coded frame within said content that is closest to said first position.

5. The first data reproduction device of claim 1, wherein said second data reproduction device transmits said first index data to said first data reproduction device responsive to a command to one of stop and pause reproduction of said content on said second data reproduction device.

6. The first data reproduction device of claim 1, wherein said first data reproduction device requests said first index data from said second data reproduction device responsive to a command to begin reproduction of said content on said first data reproduction device.

7. The first data reproduction device of claim 1, wherein:
   said first data reproduction device and said second data reproduction device are connected on a network with at least one other data reproduction device;
   said first data reproduction device requests all index data applicable to said content from said network responsive to a command to begin reproduction of said content on said first data reproduction device;
   said first data reproduction device receives said first index data responsive to said request;
   said first data reproduction device receives second index data corresponding to said at least one other data reproduction device responsive to said request; and
   said second position is determined from said first and second index data and a user input.

8. A method for operating a first data reproduction device, comprising steps of:
   receiving first index data from a second data reproduction device, said first index data indicating a first position in content stored in said second data reproduction device in a first encoding, format, said first position represents a position in which said second data reproduction device interrupted reproducing said content, said content including at least one of audio and video data;
   determining a second position in said content stored in said first data reproduction device in a second encoding format using said first index data; and
   enabling reproduction of said content in said second encoding format beginning from said second position, wherein said first index data indicates a first time interval from a beginning of said content to said first position and a second time interval from the beginning of said content to said second position is equal to the first time interval minus a predefined amount.

9. The method of claim 8, wherein said first and second data reproduction devices are coupled through a communication link and said second data reproduction device sends said first index data to said first data reproduction device through said communication link.

10. The method of claim 8, wherein said predefined amount is user programmable.

11. The method of claim 8, wherein said second position represents a position of an intra-coded frame within said content that is closest to said first position.

12. The method of claim 8, wherein said second data reproduction device transmits said first index data to said first data reproduction device responsive to a command to one of stop and pause reproduction of said content on said second data reproduction device.

13. The method of claim 8, wherein said first data reproduction device requests said first index data from said second data reproduction device responsive to a command to begin reproduction of said content on said first data reproduction device.

14. The method of claim 8, wherein said first data reproduction device and said second data reproduction device are connected on a network with at least one other data reproduction device, and further comprising steps of:

requesting all index data applicable to said content from said network responsive to a command to begin reproduction of said content on said first data reproduction device;

receiving said first index data responsive to said request;

receiving second index data corresponding to said at least one other data reproduction device responsive to said request; and determining said second position from said first and second index data and a user input.

15. A first data reproduction device, comprising:

a memory for storing first index data indicating a first position in content in a first encoding format, said first position representing a position in which said first data reproduction device interrupts reproducing said content, said content including at least one of audio and video data;

an output operative to output said first index data to a second data reproduction device; and wherein said second data reproduction device determines a second position in said content in a second encoding format using said first index data and enables reproduction of said content in said second encoding format beginning from said second position, wherein said first index data indicates a first time interval from a beginning of said content to said first position and a second time interval from the beginning of said content to said second position is equal to the first time interval minus a predefined amount.

16. The first data reproduction device of claim 15, wherein said first and second data reproduction devices are coupled through a communication link and said first data reproduction device sends said first index data to said second data reproduction device through said communication link.

17. The first data reproduction device of claim 15, wherein said predefined amount is user programmable.

18. The first data reproduction device of claim 15, wherein said second position represents a position of an intra-coded frame within said content that is closest to said first position.

19. The first data reproduction device of claim 15, wherein said output means outputs said first index data to said second data reproduction device responsive to a command to one of stop and pause reproduction of said content on said first data reproduction device.

20. The first data reproduction device of claim 15, wherein said second data reproduction device requests said first index data from said first data reproduction device responsive to a command to begin reproduction of said content on said second data reproduction device.

21. The first data reproduction device of claim 15, wherein:

said first data reproduction device and said second data reproduction device are connected on a network with at least one other data reproduction device;

said second data reproduction device requests all index data applicable to said content from said network responsive to a command to begin reproduction of said content on said second data reproduction device;

said second data reproduction device receives said first index data responsive to said request;

said second data reproduction device receives second index data corresponding to said at least one other data reproduction device responsive to said request; and said second position is determined from said first and second index data and a user input.

22. A method for operating a data reproduction device, comprising steps of:

reproducing content stored in a first encoding format, said content including at least one of audio and video data;

interrupting the reproduction of said content stored in the first encoding format and storing a first index indicating a first position in said content in said first encoding format;

determining a second position in said content stored in a second encoding format using said first index; and enabling reproduction of said content in said second encoding format beginning from said second position, wherein said first index indicates a first time interval from a beginning of said content to said first position and a second time interval from the beginning of said content to said second position is equal to the first time interval minus a predefined amount.

23. The method of claim 22, wherein said predefined amount is user programmable.

24. The method of claim 22, wherein said second position represents a position of an intra-coded frame within said content that is closest to said first position.

* * * * *